United States Patent [19]

Bonta et al.

[11] Patent Number: 4,751,725

[45] Date of Patent: Jun. 14, 1988

[54] VOX REMOTE UNIT CONTROL IN A CELLULAR SYSTEM

[75] Inventors: Jeffrey D. Bonta, Arlington Heights; Barry J. Menich, Chicago; Dennis R. Schaeffer, Buffalo Grove; Edward J. Hofstra, Elmhurst, all of Ill.

[73] Assignee: Motorola, Inc., Schaumburg, Ill.

[21] Appl. No.: 9,320

[22] Filed: Jan. 30, 1987

[51] Int. Cl.$^4$ .............................................. H04Q 7/04
[52] U.S. Cl. ........................................ 379/60; 455/33; 379/63
[58] Field of Search .................... 455/33, 54, 34, 56; 379/60, 59, 63

[56] References Cited

U.S. PATENT DOCUMENTS

| | | |
|---|---|---|
| 3,906,166 | 9/1975 | Cooper et al. |
| 3,962,553 | 6/1976 | Linder et al. |
| 4,128,740 | 12/1978 | Graziano. |
| 4,144,411 | 3/1979 | Frenkiel. |
| 4,434,461 | 2/1984 | Puhl. |
| 4,485,486 | 11/1984 | Webb et al. |
| 4,514,852 | 4/1985 | Hanni et al. ............... 375/59 |
| 4,549,311 | 10/1985 | McLaughlin. |
| 4,613,990 | 9/1986 | Halpern. |
| 4,654,879 | 3/1987 | Goldman et al. ............... 455/33 |
| 4,679,244 | 7/1987 | Kawasaki et al. ............... 455/54 |
| 4,697,281 | 9/1987 | O'Sullivan ............... 379/59 |
| 4,704,734 | 11/1987 | Mepich et al. ............... 455/33 |

OTHER PUBLICATIONS

EIA Interim Standard "Cellular System Mobile Station-Land Station Compatibility Specification" Jul., 1984, pp. 1-1 to 1-4; 3-3 to 3-21.

Motorola Technical Developments, vol. 2, Jan., 1982, "Supervisor of Portable Radiotelephones with Voice-Actuated Transmission" by Larry Puhl.

Motorola Instruction Manual No. 68P81150E01-O, "Dyna T*A*C* System Description".

The Bell System Technical Journal, vol. 58, No. 1, Jan., 1979.

"Cell-Site Hardware" by N. Ehrlich, R. E. Fisher and T. K. Wingard.

Primary Examiner—Robert Lev
Attorney, Agent, or Firm—Raymond A. Jenski; Rolland R. Hackbart; Donald B. Southard

[57] ABSTRACT

A cellular radiotelephone system providing service to remote units having a voice operated transmitter (VOX) is disclosed. If the regularly scheduled periodic signal quality measurements made by fixed site equipment indicate that the remote unit signal has not been received for a predetermined number of measurements, an audit request is transmitted to the remote unit. The remote unit responsively keys its transmitter for a predetermined period of time. A first special scan is programmed into the regular process such that the fixed site equipment may continue with its regular process until the signal quality measurement must be made. A second measurement is made following the first and if the two signal quality measurements made while the VOX remote unit is known to be transmitting agree, system reconfiguration for the service of this remote unit may be implemented by the cellular system.

14 Claims, 10 Drawing Sheets

| FIG.3A |
| FIG.3B |
| FIG.3C |
| FIG.3D |
| FIG.3E |
| FIG.3F |

VOX REMOTE UNIT CONTROL IN A CELLULAR SYSTEM

BACKGROUND OF THE INVENTION

This invention relates generally to cellular radiotelephone communications systems which may provide service to portable remote units and more particularly to the method and apparatus for determining whether the quality of the signal received from the portable remote unit is such that a change in the configuration of the radio path is necessary.

Mobile radiotelephone service has been provided for some time and traditionally has been characterized by a central site transmitting with high power to a limited number of mobile or portable remote units in a large geographic area. Mobile or portable transmissions, due to their lower transmission power, were generally received in previous systems by a network of receivers remotely located from the central site and the received transmission was subsequently returned to the central site for processing. In previous systems only a limited number of radio channels were available, thus limiting the number of radiotelephone conversations in an entire city to the limited number of channels available.

Modern cellular radiotelephone systems have a comparatively large number of radio channels available which, further, can be effectively multiplied by reuse of the channels in a metropolitan area by dividing the radio coverage area into smaller coverage areas (cells) using low power transmitters and coverage restricted receivers. Such cellular systems are further described in U.S. Pat. Nos. 3,906,166; 4,485,486; and 4,549,311, each assigned to the assignee of the present invention. The limited coverage area enables the channel frequencies used in one cell to be reused in another cell geographically separated according to a predetermined plan. Radio frequency energy may be transmitted from and received by a plurality of centrally located fixed stations and reuse of frequencies is accomplished in a predetermined repetitive pattern of cells. Alternative cell configurations and patterns may illuminate various sectors of a cell or may illuminate a cell from points other than from the center.

A cell system typically utilizes one duplex frequency pair channel in each cell (a signalling channel) to receive requests for service from mobile and portable remote units, to Call selected mobile or portable remote units, and to instruct the mobile or portable remote units to tune to another channel where a conversation may take place. This signalling channel is continuously assigned the task of receiving and transmitting data to control the actions of the remote units during call set-up.

Since the cells may be of relatively small size, the likelihood of a remote unit travelling between sectors or out of one cell and into another cell is high. The process of switching the established call from one sector or from one cell to another is known as handoff. Handoff generally requires specialized receiving equipment such as a "scanning" receiver which can be instructed to tune to any of the channels in use in any of the sectors of the cell to measure the signal strength of each active mobile or portable remote unit. If the measured signal strength or quality is below a predetermined level, cellular control equipment can take one of several steps to improve the quality of signal from the remote unit. The power being transmitted by the remote unit may be increased by a command transmitted by the control equipment on the channel in use. The antenna being used by the fixed equipment may be changed to a more optimum antenna (if the system design is so configured). Also, the remote unit may be handed off to another cell for continuation of the call on another frequency in the other cell.

A problem arises when a portable remote unit employs a transmitter which turns on and off depending upon whether a signal to be transmitted, e.g. voice, is present. A voice operated transmitter (VOX) significantly reduces the power drawn from a necessarily small portable remote unit battery and greatly prolongs battery life. However, if the control equipment requires a measurement of signal quality while the portable remote unit transmitter is off, an erroneous determination of signal quality will certainly be made.

SUMMARY OF THE INVENTION

Therefore, one object of the present invention is to enable a correct measurement of signal quality to be made from a remote unit having a VOX capability.

It is a further object of the present invention to prevent excessive use of the VOX-capable remote unit transmitter for signal quality measurement alone.

It is a further object of the present invention to sequence the measurement of signal quality by the control equipment such that a reliable signal measurement is made.

Accordingly, these and other objects are realized in the present invention which encompasses a radio communications system providing service to a voice operated transmitter (VOX) remote unit. To determine the need for changing the system configuration of transmitting and receiving between the remote unit and a fixed station, the invention employs means for measuring remote unit signal quality at predetermined intervals. Since the remote unit may use VOX, the fixed station transmits an audit request to the remote unit after a predetermined number of signal quality measurements indicate a signal is not being received. The remote unit then transmits for a predetermined period of time in response to the audit request. A first measurement of signal quality is subsequently made after a first predetermined time delay and a second measurement of signal quality is made after a second predetermined time delay from the first signal quality measurement. The two signal quality measurements are compared and, in response to the result, a need for change in system configuration is determined if the measurements are similar.

DESCRIPTION OF THE PREFERRED EMBODIMENT

Figure 1:
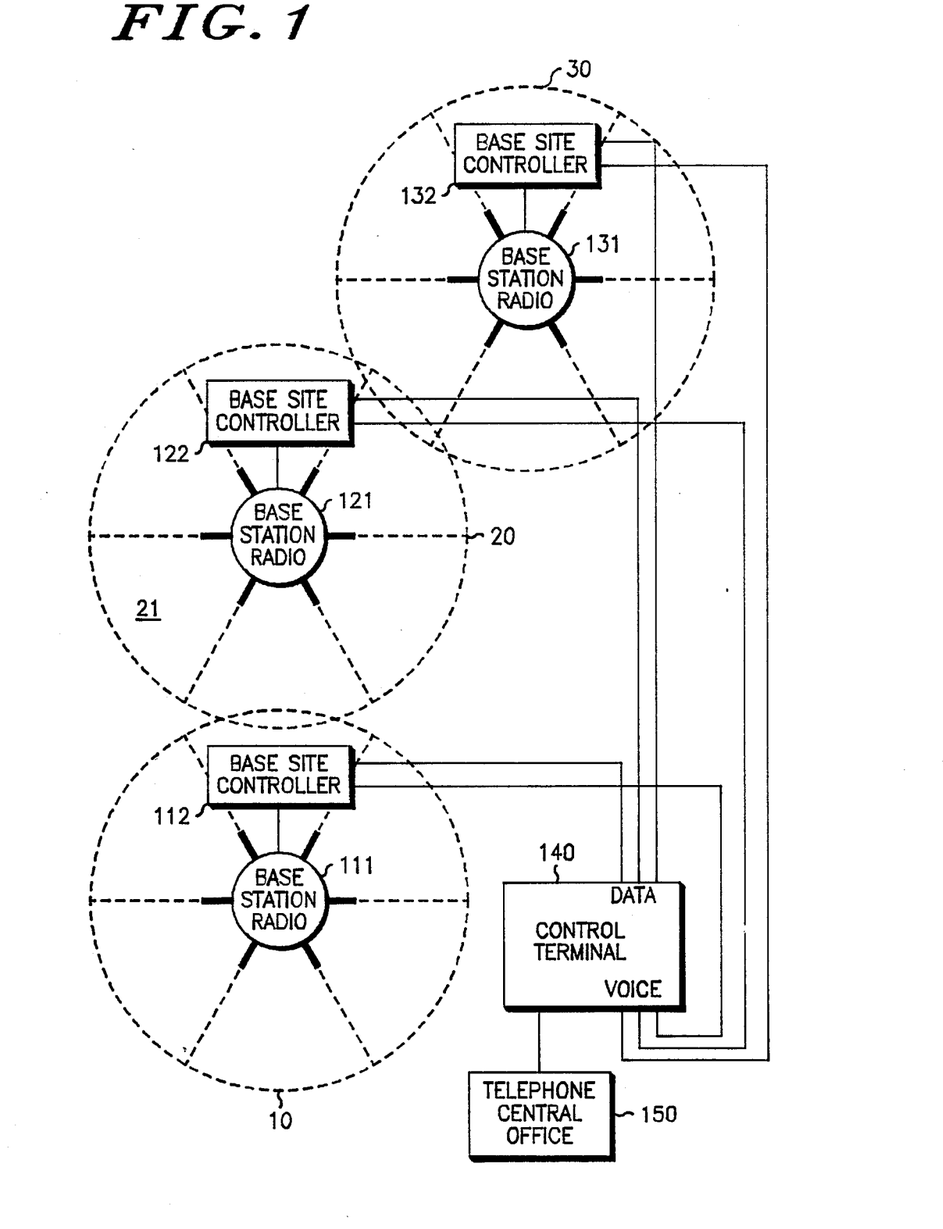
FIG. 1 is a block diagram of a radiotelephone communications system which may advantageously employ the present invention.

Referring to FIG. 1, there is illustrated a cellular radiotelephone communications system of the type described in U.S. Pat. Nos. 3,663,762, 3,906,166; in an experimental cellular radiotelephone system application filed under FCC Docket No. 18262 with the Federal Communications Commission by Motorola and American Radio-Telephone Service, Inc., in February 1977; and more recently in a system description entitled "Motorola DYNATAC Cellular Radiotelephone Systems", published by Motorola, Inc., Schaumburg, Ill., in 1982. Such cellular systems provide telephone coverage to both mobile and portable radiotelephones located throughout a large geographical area. Portable radiotelephones may be of the type described in U.S. Pat. Nos. 3,962,553; 3,906,166; and 4,486,624, and mobile radiotelephones may be of the type described in Motorola instruction manual number 68P81039E25, published by Motorola Service Publications, Schaumburg, Ill., in 1979. The geographical area may be subdivided into cells 10, 20 and 30, which each may include a base station radio 111, 121 and 131 and in associated base site controller 112, 122 and 132. Base site controllers 112, 122 and 132 are each coupled by data and voice links to a radiotelephone control terminal 140, which may be similar to the terminals described in U.S. Pat. Nos. 3,663,762; 3,764,915; 3,819,872; 3,906,166; and 4,268,722; and in U.S. patent application Ser. No. 830,390, filed Feb. 18, 1986, entitled "Interface Method and Apparatus for a Cellular System Site Controller" and invented by Barry Menich, et al. These data and voice links may be provided by dedicated wire lines, pulse-code-modulated carrier lines, microwave radio channels, or other suitable communication links. Control terminal 140 is in turn coupled to a conventional telephone central office 150 for completing telephone calls between mobile and portable radiotelephones and landline telephones.

Each base station radio 111, 121 and 131 in FIG. 1 includes a plurality of transmitters and receivers for operating on at least one duplex signalling channel and a plurality of duplex voice channels. Base station radios 111, 121 and 131 may be of the type described in Motorola instruction manual number 68P81060E30, published by Motorola Service Publications, Motorola, Inc. Schaumburg, Ill., in 1982 or as described in U.S. patent application Ser. No. 830,145 (now U.S. Pat. No. 4,694,484) filed Feb. 18, 1986, entitled "Improved Cellular Radiotelephone Land Station" and invented by Frederick Atkinson, et al. Base station radios 111, 121 and 131 are located substantially at the center of each of the corresponding cells 10, 20 and 30. The base station transmitters may be combined onto one omni-directional antenna, while the base station receivers may be intercoupled to two or more directional or omni-directional sector antennas In FIG. 1 the base station radios 111, 121 and 131 each include six 60° sector antennas. Each sector antenna primarily covers a portion of a cell, such as portion 21 of cell 20, and typically has a coverage area that overlaps the coverage area of adjacent sector antennas. Since the signalling channel requires and omni-directional receiving pattern, the signals received by the six sector antennas may be combined by a maximal ratio predetection diversity combiner, as illustrated and described in U.S. Pat. No. 4,369,520 and U.S patent application Ser. No. 268,613, filed on June 1, 1981, entitled "Large Dynamic Range Multiplier for a Maximal-Ratio Diversity Combiner", and invented by Frank J. Cerny, Jr. and now abandoned or as described in aforementioned U.S. Pat. No. 4,694,484, "Improved Cellular Radiotelephone Land Station". Furthermore, coverage of a portion of a cell may be provided by combining the signals received by two or more of the sector antennas. The sector antennas and associated receiving apparatus may be of the type described in U.S. Pat. Nos. 4,101,836 and 4,317,229.

In order to determine whether or not a mobile or portable radiotelephone leaves one cell, e.g. 20, and enters another, e.g. 10 or 30, the signal strength of the mobile or portable radiotelephone must be monitored by the base site controller 122. When the signal strength of a mobile or portable radiotelephone becomes too weak, the receiving sector antenna may be changed, or the strength of its transmitted signal may be increased by a control signal transmitted from the base site controller 122, or the mobile or portable radiotelephone can be handed off to a base site controller 112 or 132 in another cell. Handoff involves transferring the particular mobile or portable radiotelephone from a duplex voice channel in one cell to a duplex voice channel in another cell. The signal strength for each operating mobile and portable radiotelephone can be quickly and accurately measured by utilizing the inventions described in U.S. Pat. No. 4,549,311, in U.S. patent application Ser. No. 829,872, (now U.S. Pat. No. 4,704,734 filed on Feb. 18, 1986, entitled "Method and Apparatus for Signal Strength Measurement and Antenna Selection in Cellular Radiotelephone Systems" and invented by Barry Menich, et al., and in U.S. patent application Ser. No. 830,166 filed on Feb. 18, 1986, entitled "Scanning Receiver Allocation Method and Apparatus for Cellular Radiotelephone Systems" and invented by Barry Menich, et al. so that corrective action can be taken before communications are degraded or interrupted due to weak signal conditions. Furthermore, as a mobile or portable radiotelephone moves closer to a base station radio 111, 121 or 131, the strength of the RF signal received at the base station radio from the mobile or portable radiotelephone increases and can cause interference with other communications. Accordingly, when the signal strength of a mobile or portable radio becomes too large, a base site controller can sense a control signal to the particular mobile or portable radiotelephone causing it to reduce the strength of its transmitted signal. A supervisory signalling scheme and apparatus therefore that provides for such control signals is described in U.S. Pat Nos. 3,906,166; 4,025,853; 4,029,900; 4,302,845; and 4,312,074 and the references cited therein. Additionally, mobile or portable power levels may be adjusted as part of the handoff process as described in U.S. patent application Ser. No. 893,116 (now U.S. Pat. No. 4,696,027 filed on Aug. 1, 1986, entitled "Handoff Appartus and Method with Interference Reduction for a Radio System" and invented by Jeffrey D. Bonta.

Figure 2:
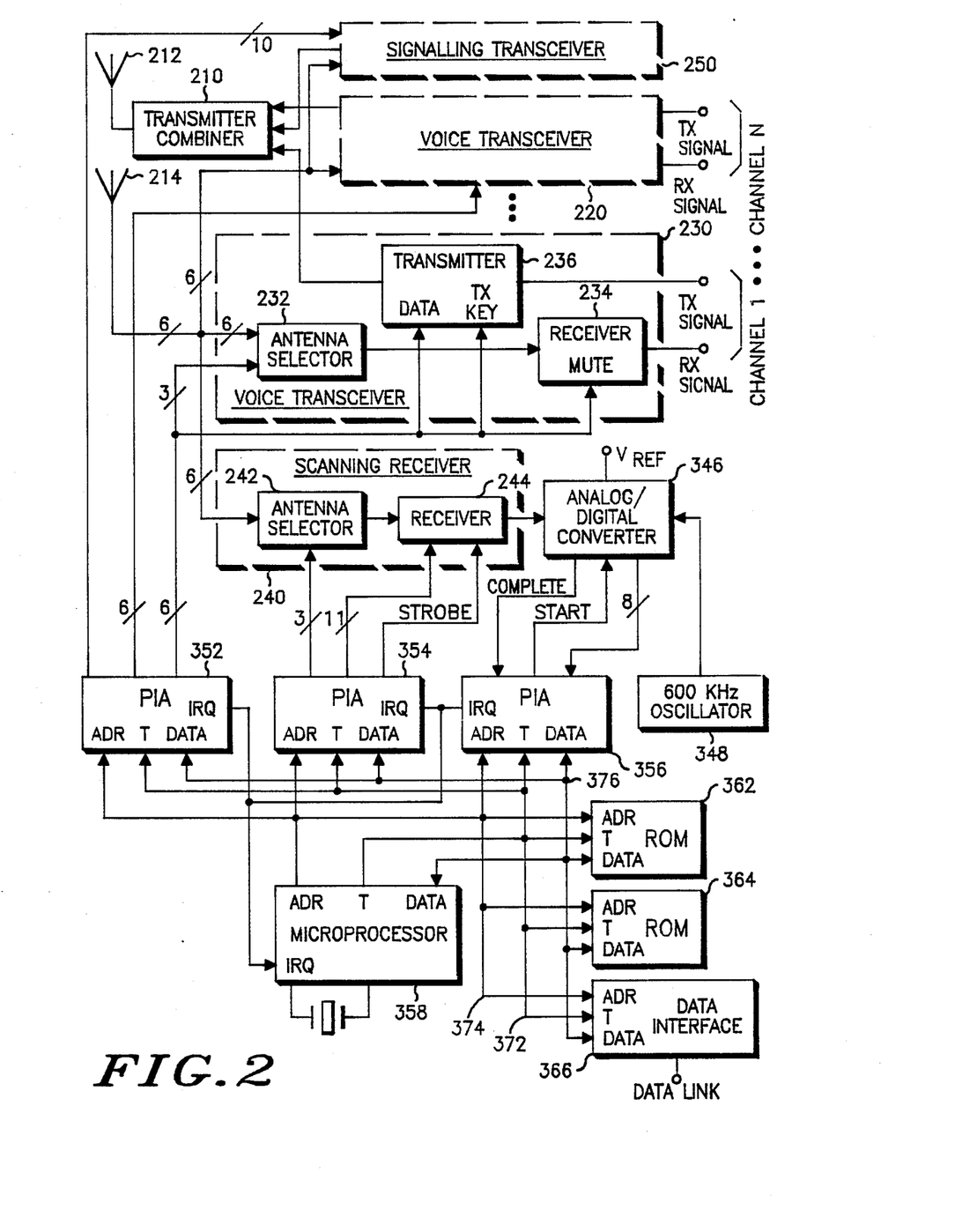
FIG. 2 is a block diagram of the equipment which may be found at the fixed cell site and includes base station voice receivers, scanning receivers, signalling receivers, voice channel transmitters, signalling transmitters, and base site controllers.

Referring to FIG. 2, there is illustrated a block diagram of equipment suitable for use in base station radios 111, 121 and 131 and associated base site controllers 112, 122 and 132 shown in FIG. 1. The base radio equipment is identified by reference numerals between 200 and 300, and the base site controller equipment by reference numbers between 300 and 400. For example, the base station radios may include a scanning receiver 240; a signalling transceiver 250; a plurality of voice transceivers 220 and 230 each coupled to simplex transmit and receive signals from the control terminal 140 in FIG. 1; a transmitter combiner 210 for combining the transmitters of the voice transceivers and signalling transceiver, and coupling the combined signal to an omni-directional transmit antenna 212; and a plurality of sector antennas 214 coupled to the scanning receiver 240 and the receivers of the voice transceivers 220 and 230 and signalling transceiver 250. As previously explained, the transmit and receive signals may be coupled from voice transceivers 220 and 230 by means of modems and dedicated wire lines to control terminal 140 in FIG. 1. Signalling transceiver 250, voice transceivers 220 and 230, and scanning receiver 240 may be provided by the equipment described in the aforementioned Motorola instruction manual number 68P81060E30. Other cellular configurations, which as those illuminating each sector with one or more independent transmitters or those employing reprogrammable voice transceivers as scanning receivers, may similarly benefit from the present invention.

The operation of the signalling transceiver 250, voice transceivers 220 and 230 and scanning receiver 240 is controlled by a base site controller, which may include one or more microprocessors 358; peripheral interface adapters (PIA's) 352, 354 and 356; an analog-to-digital converter (ADC) 346 and associated oscillator 348; a read only memory (ROM) 362; a random access memory (RAM) 364; and a data interface 366 which couples microprocessor 358 by way of a modem and dedicated wire line to control terminal 140 in FIG. 1. As the number of voice channels is increased, additional microprocessors and associated interface circuitry can be added to the base site controller for sharing the supervisory workload. Sharing of the workload with multiple microprocessors may provide time savings since different microprocessors can be simultaneously working on different portions of a task.

The voice transceivers 220 and 230 in FIG. 2 each may include a transmitter 236, a receiver 234 and an antenna selector 232 for coupling one or more sector antennas 214 to receiver 234. Microprocessor 358 controls the operation of voice transceivers 220 and 230 by means of control signals provided by PIA 352. In order to select one of the six sector antennas 214, three control signals are coupled from PIA 352 to antenna selector 232. Additional control signals provided by PIA 352 activate transmitter 236 for transmitting control signals or RF signals modulated with voice signals, and mute the output of receiver 234 when an RF signal is not being received. For example, if a supervisory audio tone is used to indicate that a desired RF signal is present, receiver 234 can be muted whenever the supervisory audio tone is not detected. The RF signal from transmitter 236 is coupled to transmitter combiner 210 where it is combined with the RF signals from other voice transceivers for application to omni-directional antenna 212. Transmitter combiner 210 may be any conventional RF signal combiner, such as, for example, the combiner described in U.S. Pat. No. 4,375,622. In some radiotelephone communications systems, it may be desirable to couple the RF signal from the transmitters in voice transceivers 220 and 230 to separate directional or omni-directional antennas 212, thus eliminating the need for transmitter combiner 210.

Scanning receiver 240 in FIG. 2 includes an antenna selector 242 which is coupled to the six sector antennas 214, and a receiver 240 that is coupled to the output antenna selector 242. Three control signals from PIA 354 cause antenna selector 242 to coupled one of the six sector antennas 214 to receiver 244. Receiver 244 may be a conventional synthesized receiver (such as the receiver in the mobile radiotelephone described in the aforementioned Motorola Instruction Manual No. 68P81039E25), whose frequency of reception may be determined by an eleven bit data signal applied to receiver 244 by PIA 354. An output from receiver 244, which is proportional to the strength of the RF signal being received (e.g., such as the filtered output of an envelope detector), is coupled to ADC 346, which converts the magnitude of the receiver output to an eight-bit data signal. ADC 346 is controlled by PIA 356, which applies a start signal to ADC 346 for initiating the analog-to-digital conversion process. ADC 346 is also coupled to 600 kHz oscillator 348, and completes a conversion in approximately 120 microseconds. When the analog-to-digital conversion is complete, a complete signal is applied to PIA 356 by ADC 346. ADC 346 may be any suitable conventional analog-to-digital converter, such as, for example, an ADC0803 manufactured by National Semiconductor Corporation.

The signalling transceiver 250 likewise includes a transmitter and receiver (not shown) which are tunable to any desired signalling channel in the particular radiotelephone communications system. The transmitter of signalling transceiver 250 may be coupled to transmitter combiner 210, and the receiver of signalling transceiver 250 may be coupled to a maximal ratio predetection diversity combiner of the type described in the aforementioned U.S. Pat. No. 4,369,520 and U.S. patent application Ser. No. 268,613, now abandoned, for combining the signals from sector antennas 214 to provide an omni-directional receiving pattern. The signalling transceiver 250 provides for the transmission of digital supervisory signalling between microprocessor 358 and mobile and portable radiotelephones in its cell. Control signals are applied to, and data signals are received from, signalling transceiver 250 by means of PIA 352. Once a telephone call is in process, microprocessor 358 can transmit control signals to an active mobile or portable radiotelephone by means of the transmitters in voice transceivers 220 and 240. A suitable supervisory signalling scheme is described in the aforementioned U.S. Pat. Nos. 3,906,166; 4,025,853; 4,029,900; 4,302,845; and 4,312,074.

As explained hereinabove, the operation of the voice transceivers 220 and 230 and scanning receiver 240 is controlled by microprocessor 358. Microprocessor 358 may be any suitable conventional microprocessor, such as, for example, a Motorola type MC6800, MC6801, or MC6802 microprocessor. Microprocessor 358 may be suitably programmed to execute the flowchart in FIGS. 3A, 3B, 3C, 3D, and 3E for assigning duplex voice channels, scanning duplex voice channels assigned to mobile or portable remote units in its cell, and for causing those remote units using VOX to turn their transmitters on at time selected optimally for signal quality measurement.

Figure 3A:
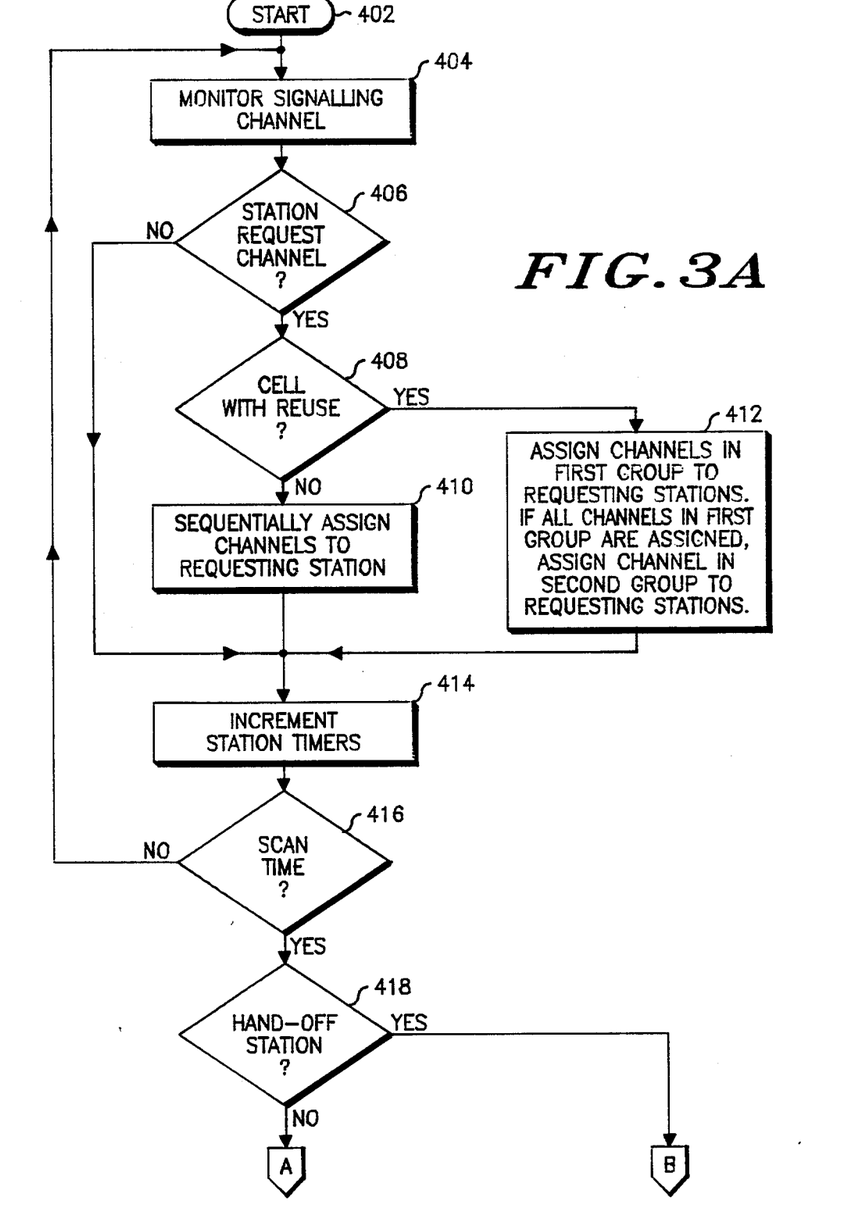
FIGS. 3A, 3B, 3C, 3D, 3E, and 3F arranged as in FIG. 4 are a flowchart diagramming the process employed in the present invention.
Figure 3B:
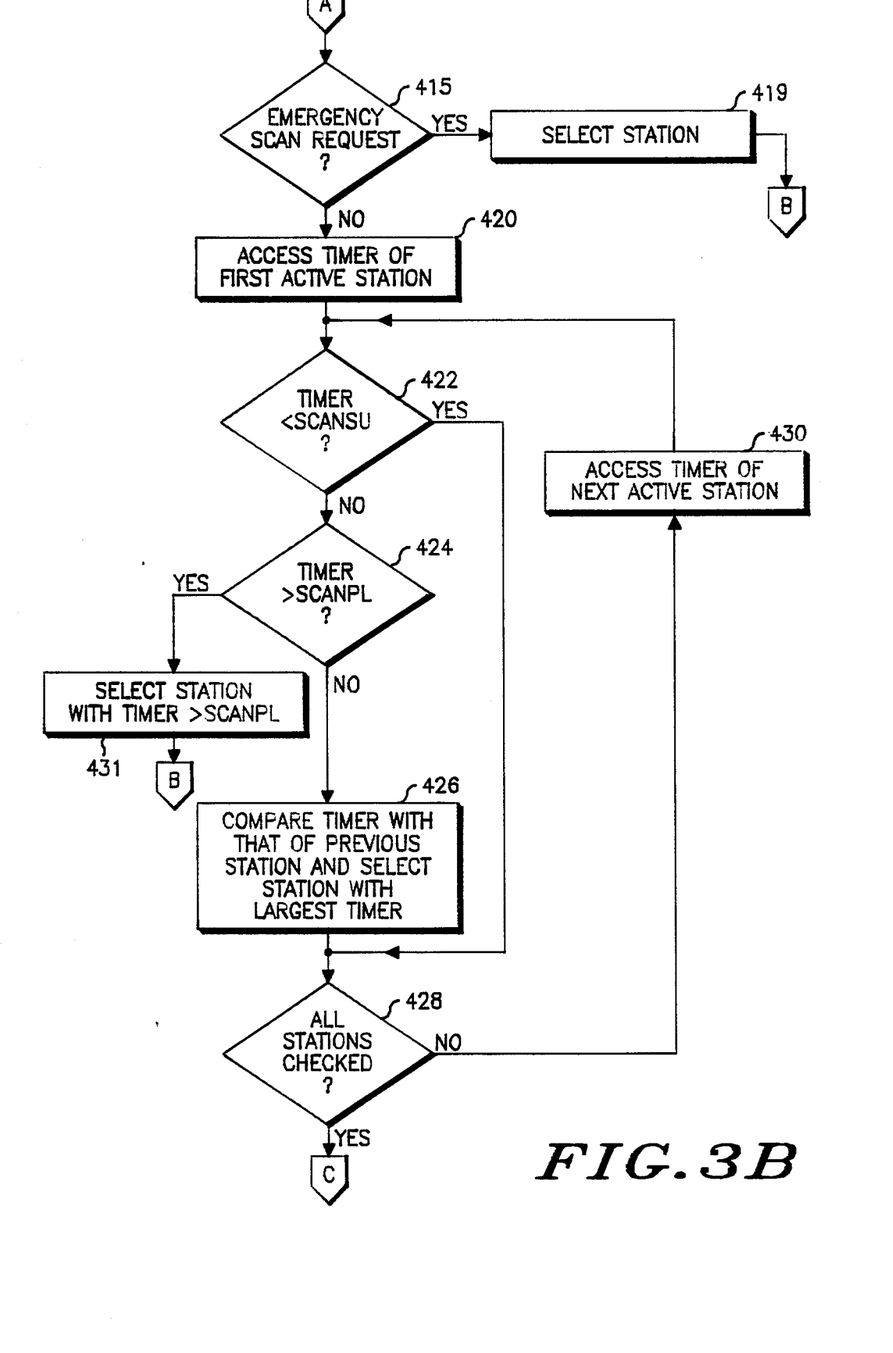
Figure 3C:
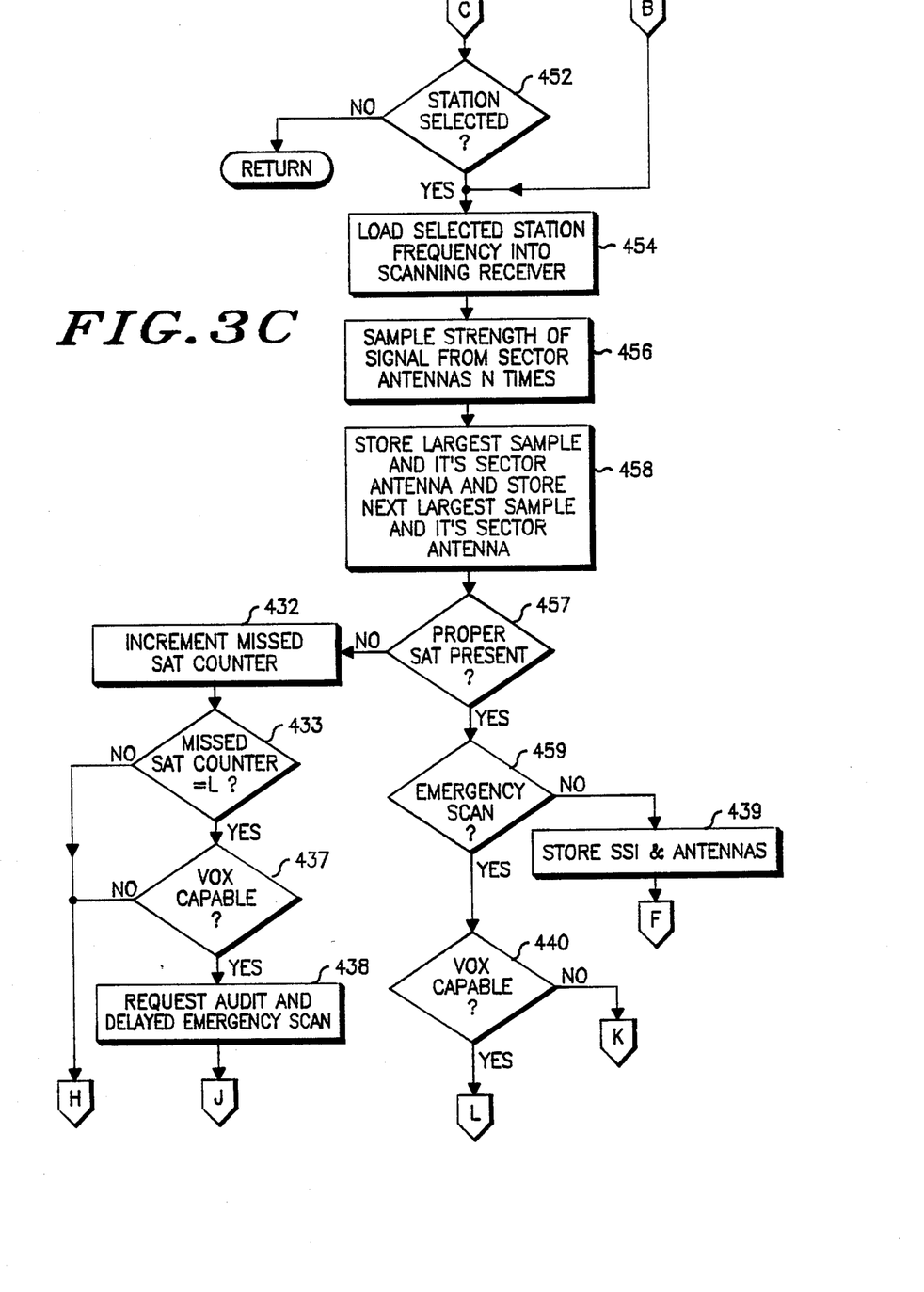
Figure 3D:
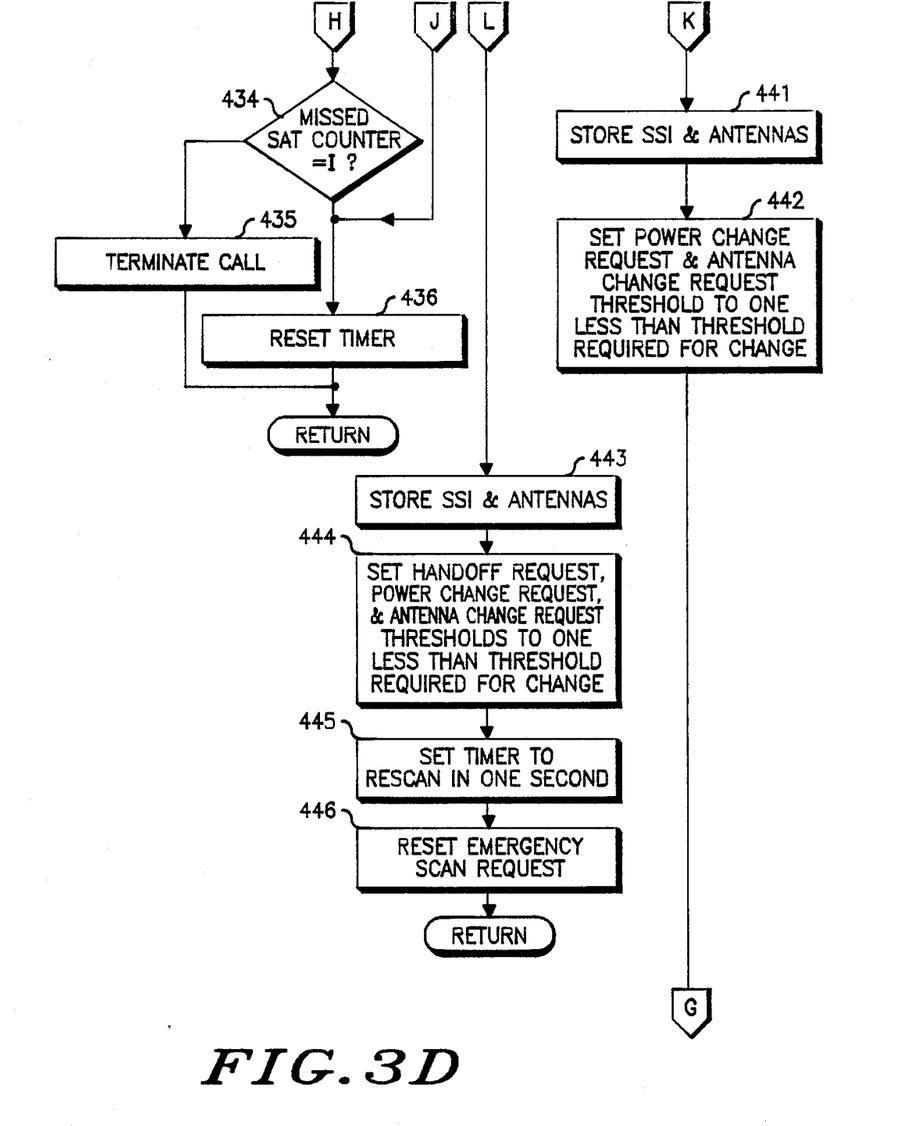
Figure 3E:
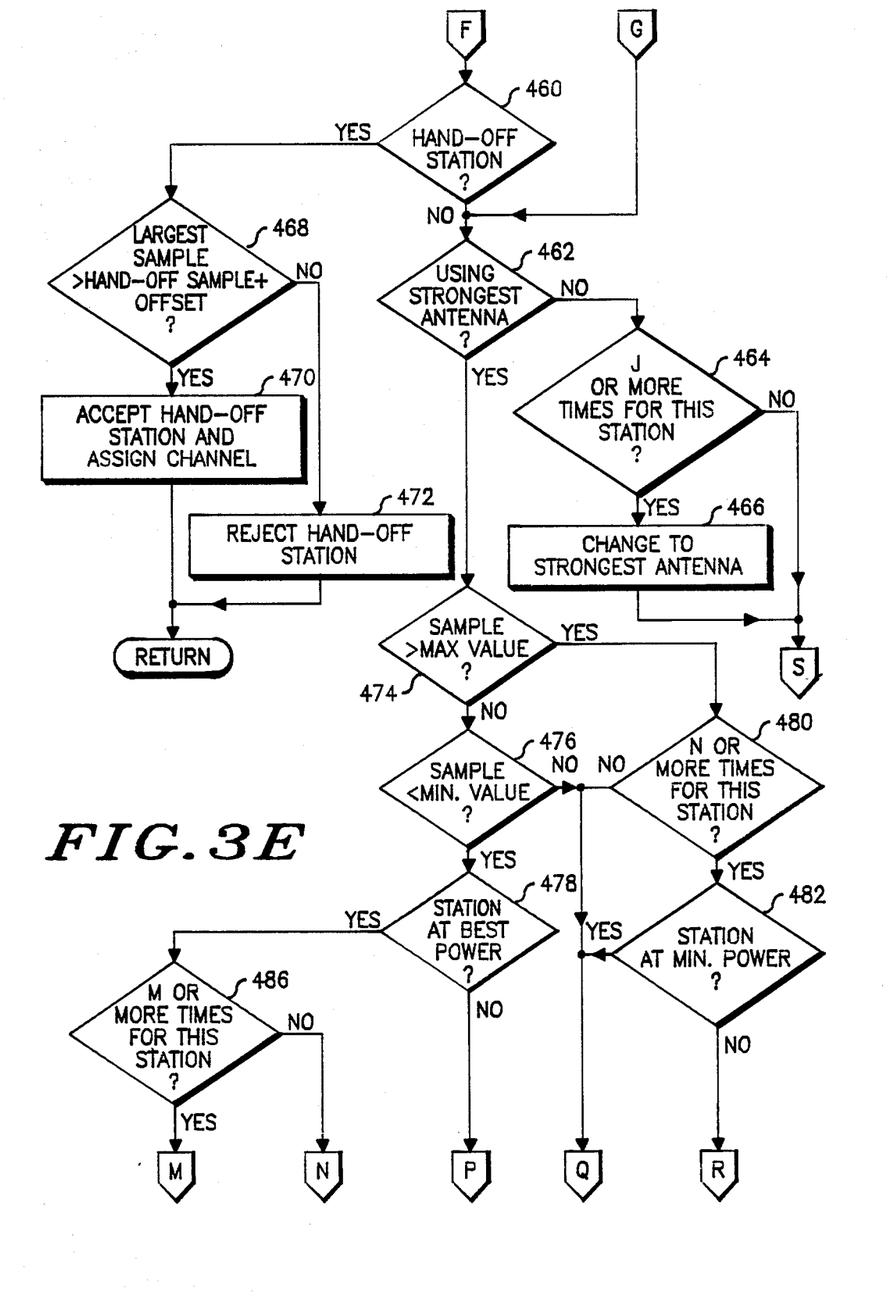
Figure 4:
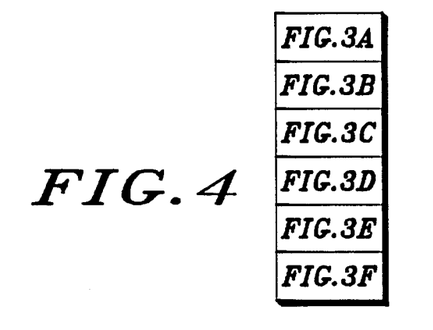

Referring to FIGS. 3A, 3B, 3C, 3D, and 3E as arranged in FIG. 4, there is illustrated a flow chart embodying the channel assigning and scanning methods of the present invention. Entering the channel assigning portion of the flow chart as START block 402 in FIG.

3A, program control proceeds to block 404 where microprocessor 358 in FIG. 2 monitors the signalling channel for channel request signals from mobile or portable radiotelephone states. If no station requests a channel, NO branch is taken from decision block 406 to block 414. Otherwise, YES branch is taken from decision block 406 to decision block 408 where it is determined whether or not this cell has frequency reuse. Cells which are sufficiently geographically separated can both utilize the same frequency radio channels. If this cell has frequency reuse, YES branch is taken to block 412 where a channel from a first group of radio channels is assigned to a requesting station. For example, assuming each reuse cell has the same set of channels each having different RF signal frequencies and being assigned the same number in each reuse cell, the first group of channels in one of the reuse cells may be even numbered channels, while the first group of channels in the other reuse cell may be odd numbered channels. Thus, cochannel interference between reuse channels will be minimized during conditions when only channels of the first group are used to accommodate telephone calls in the reuse cells, since both reuse cells are using different frequency channels. In order to make sure that all channels are periodically exercised, the even/odd channel pattern may be changed once per hour in the reuse cells. If a cell does not have reuse, NO branch is taken from decision block 408 to block 410 where channels are sequentially assigned on a round robin basis to requesting stations.

Next, at block 414 in FIG. 3A, timers associated with each active remote unit are incremented by one every predetermined time interval, such as, for example, every fifty milliseconds. The station timers indicate how long it has been since the last time the corresponding station was scanned to determine its signal strength. Therefore, the station timers can be monitored to determine whether or not any action must be taken to avoid degradation in communications with the active stations. Next, at decision block 416, it is determined whether or not it is time to scan the active remote units. These active units must be scanned at periodic intervals to insure that each active unit has adequate signal strength to provide good voice communications. The time interval between scanning active units depends on a number of things, including the time it takes scanning receiver 240 in FIG. 2 to tune to the frequency of a selected station, the time it takes the scanning receiver to switch to another sector antenna, the number of signal strength samples taken for each sector antenna, and the time between taking each signal strength sample. Assuming that scanning each active remote unit every seven seconds is adequate for a cell having a ten mile diameter, then scans would have to be performed approximately six times per second to handle a cell having thirty-two voice channels. In other words, forty-two units including those in adjacent cells which are candidates for handoff into the scanning cell could be scanned in the seven second time interval. On the foregoing basis, the time between scans may be selected to approximately 170 milliseconds for each cell in most radiotelephone communications systems. If it has not been 170 milliseconds since the last scan, NO branch is taken from decision block 416 back to block 404 to resume monitoring of the signalling channel for channel request signals. Assuming it has been 170 milliseconds or more since the last scan, YES branch is taken to block 418 where the scanning portion of the flow chart is entered. If an emergency scan request is found at decision block 415, the station requiring the scan is selected at 419 and the scanning portion of the process is entered immediately.

The scanning method of the present invention quickly and efficiently takes signal strength measurements on each sector antenna for a selected remote unit on, and, on the basis of the measured signal strength, either takes no further action, or changes sector antennas, or raises or lowers the power of the signal transmitted from the selected unit, or hands off the selected unit to another cell so as to optimize its signal strength for good voice communications. Parameters utilized by the scanning method can be varied in each cell in order to optimize voice communications in a particular radiotelephone communications system. For example, parameters may be utilized to set the minimum and maximum allowable signal strengths for each cell or for each sector of a cell. In other words, different cells or even different sectors of a cell may have different minimum and maximum allowable signal strength parameters. Also, parameters can be varied for determining how many out-of-range signal strength readings must have been taken before changing sector antennas, or changing the power output of a station, or handing off a unit to another cell. For example, when the signal strength of a selected unit is below the minimum allowed level, an attempt may first be made to change the sector antenna used in the receiver of the voice transceiver assigned to the selected unit. If no other sector antenna is receiving a stronger signal from the selected station, or changing sector antennas did not result in a signal strength greater than the minimum allowed signal strength, then an attempt may be made to increase the power output of the selected unit. The power output of the selected unit can be increased in one or more steps between a minimum level and a maximum level. If the selected unit is already transmitting at optimum power and its signal strength is still below the minimum allowed signal strength, an attempt may be made to hand off the selected unit to another cell. Conversely, when the signal strength of a selected unit exceeds the maximum allowable signal strength, the power output of the selected unit may be reduced in one or more steps to prevent overloading of the receiver in the voice transceiver assigned to the remote unit.

Each time the scanning portion of the flow chart in FIG. 3A is entered at block 418, one active unit is processed. Handoff units are given priority over all other active units including emergency scan requests, since a handoff unit is most likely already outside of the cell that is presently servicing it. Therefore, at decision block 418, a check is made to determine whether a request has been received from another cell to scan a handoff unit. If so, YES branch is taken to block 454 in FIG. 3C in order to measure the signal strength of the handoff unit. The sector antenna receiving the strongest signal from the handoff unit is identified in blocks 454, 456 and 458. Next, at decision block 460, YES branch is taken to decision block 468, where the largest signal strength sample is compared to the sample received from the requesting cell. If the largest signal strength sample is greater than the requesting cell sample plus an offset value, YES branch is taken to block 470 (FIG. 3E), where the handoff unit is accepted and is subsequently assigned a channel. If the largest signal strength sample is not greater than the requesting cell sample plus an offset, NO branch is taken from decision block 468 to block 472, where the handoff station is rejected.

A message indicating acceptance or rejection is returned via the control terminal 140 in FIG. 1 to the requesting cell. An alternative way of handling handoff stations is to make a direct comparison between the largest signal strength sample and a threshold value, which may be determined by a stored parameter. From blocks 470 and 472, program control returns to monitoring the signalling channel.

Returning to decision block 418 in FIG. 3A, if there are no handoff requests, NO branch is taken to block 420 where the timer of the first active station is accessed. Next, the portion of the flow chart starting in FIG. 3B at block 422 essentially selects the station which has the largest timer indicating that the elapsed time since it was last scanned is greater than that for any other active station. Proceeding to decision block 422, the accessed timer is compared to a parameter labeled SCANSU, which is a time period during which subsequent scanning is suppressed, In the preferred embodiment of the present invention, SCANSU has been selected to be several seconds. If the accessed timer is less than SCANSU, YES branch is taken to decision block 428, where it is determined whether or not the timers for all active stations have been accessed and checked. If not, NO branch is taken to block 430 where the timer of the next active station is accessed, and the process is repeated from decision block 422.

If the accessed timer is greater than SCANSU, NO branch is taken from decision block 422 in FIG. 3B to decision block 424, where the accessed timer is compared to a parameter labeled SCANPL. SCANPL is the maximum allowable time from the previous scan for a selected station. In the preferred embodiment of the present invention, SCANPL has been selected to be seven seconds. If the accessed timer is less than SCANPL, NO branch is taken to block 426, where, if the corresponding station is still active and transmitting an RF signal, its accessed timer is compared with the previously selected timer and the larger of the two is selected. When all active station timers have been accessed and checked, the station selected at block 426 is presently transmitting an RF signal and has a timer that is greater than SCANSU but less than SCANPL.

If a station timer is greater than SCANPL, YES branch is taken from decision block 424 in FIG. 3B to decision block 431, where the remote unit having the station timer with a time greater than SCANPL is selected. The scanning portion of the process is then entered in FIG. 3C.

If a RETURN block is reached before all station timers have been accessed and processed by blocks 422, 424, 426, 428, and 430 in FIG. 3B, program control is returned to monitoring of the signalling channel for channel requests from mobile and portable radiotelepone units. If decision block 428 is reached and all station timers have been accessed and checked, YES is taken to decision block 452 in FIG. 3C, where it is determined whether or not an active, transmitting unit had been selected in block 426. If a station was not selected, NO branch is taken and program control returns to monitoring the signalling channel. If a unit has been selected, YES branch is taken from decision block 452 to block 454 to begin the process of measuring the signal strength of the selected unit.

Next, at block 454 in FIG. 3C, scanning receiver 240 in FIG. 2 is loaded with the frequency of the channel on which the selected station is operating. Proceeding to block 456, the signal strength of the signal received by each sector antenna is measured N times, where N is a parameter greater than one. In the one exemplary embodiment, N may be set to thirty-two so that thirty-two signal strength samples are taken for each of the six sector antennas. Then, at block 458, microprocessor 358 in FIG. 2 saves the largest signal strength sample taken in block 456 and its corresponding sector antenna number, and, for the remaining sector antennas, saves the next largest signal strength sample and its corresponding sector antenna number.

From the saving step of block 458, a test is made of whether the proper supervisory audio tone (SAT) is being transponded by the remote subscriber station (at 457). If proper SAT is received, a test for the presence or absence of an emergency scan request is made, at decision block 459. If the request has not been made by a previous action, the process proceeds normally to determine whether a handoff is necessary, at decision block 460 in FIG. 3E. The handoff decision decides whether or not the station being processed is a handoff station. If so, YES branch is taken to block 468, where it is determined whether or not to accept the handoff station. If the station is not a handoff station, NO branch is taken from decision block 460 to decision block 462, where it is determined whether or not the voice transceiver assigned to the selected station is using he sector antenna receiving the strongest signal. In other words, if the sector antenna presently being used by the voice transceiver 220 or 230 in FIG. 2 assigned to the selected mobile station is not receiving the strongest signal, the selected antenna coupled to the voice transceiver may be changed to improve the quality of voice communications. If the transceiver assigned to the selected station is not using the sector antenna having the largest signal strength sample, NO branch is taken to decision block 464, where it is determined if this condition has occurred J or more times, where J is a parameter greater than one. If so, YES branch is taken to block 466 where the voice transceiver assigned to the selected station is switched to the sector antenna having the largest signal strength sample. By requiring that this condition occurs J or more times, excessive switching between sector antennas is avoided. Program control proceeds from NO branch of decision block 464 and from block 466 to the station timer reset step 494 in FIG. 3F, where the timer of the selected station is reset to zero. The selected station timer is reset at block 494 so that the particular station will not be scanned against until after a time interval of length SCANSU. If scans could occur too frequently, both unnecessary overhead would be created and successive signal strength readings may be too highly correlated. Therefore, the scan frequency should be high enough to ensure that any station passing through the transition region between cells at top speed would be scanned at least the M times required for hand off in block 486 in FIG. 3E. Thus, excessive scanning is prevented through the use of the delay parameter, SCANSU, which establishes the minimum amount of time which must elapse before a station is eligible to be scanned again.

Figure 3F:
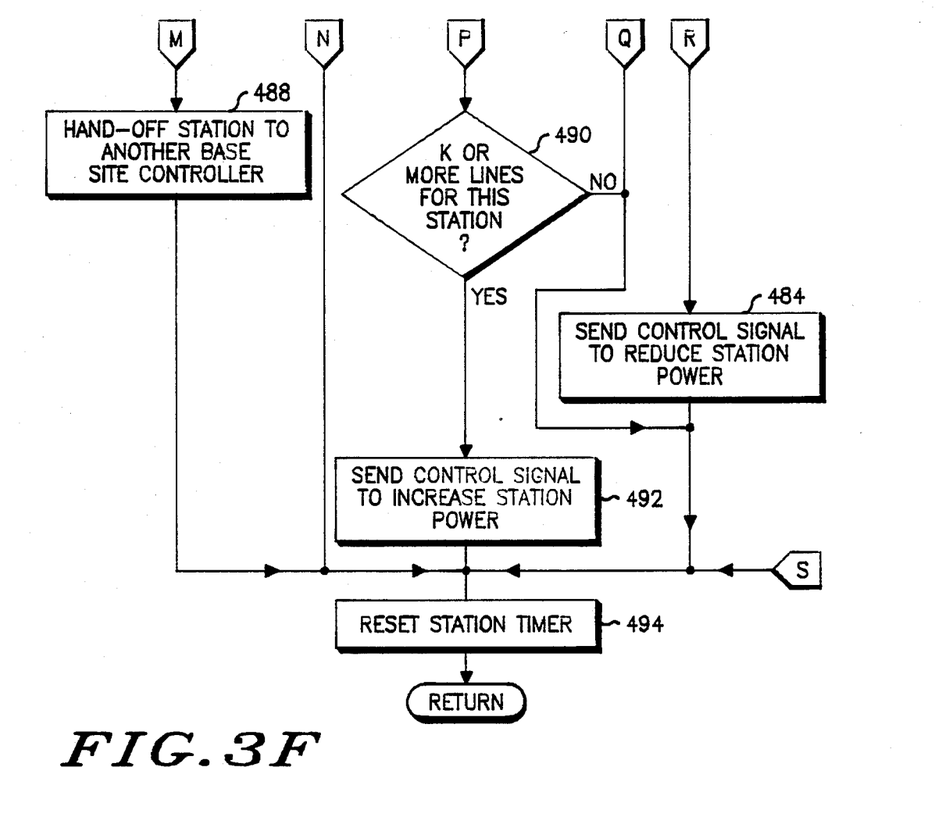

If the selected station is already using the sector antenna having the largest signal strength sample, YES branch is taken from decision block 462 in FIG. 3E to sample value decision block 474, where it is determined whether the largest signal strength sample is greater than the maximum allowable signal strength. If so, YES branch is taken to decision block 480 where it is determined whether or not this condition has occurred N or more times, where N is a parameter greater than one. If so, YES branch is taken to decision block 482, where it is determined whether or not the selected station is already at minimum power output. If not, NO branch is taken to block 484 where a control signal is sent by microprocessor 358 in FIG. 2 to the selected station commanding it to reduce its power output. The power output reduction can be taken in one or more steps until the minimum power output is reached. Program control proceeds from NO branch of decision block 480. YES branch of decision block 482 and from block 484 to block 494, where the timer of the selected station is reset to zero.

If the largest signal strength is not greater than the maximum allowable signal strength. NO branch is taken from decision block 474 in FIG. 3E to minimum sample value decision block 476 where the largest signal strength sample is compared to the minimum allowable signal strength. NO branch is taken to block 494 in FIG. 3F where the selected station timer is reset. Otherwise, YES branch is taken from decision block 476 to decision block 478, where it is determined whether or not the selected station is transmitting at the best power output. If the selected station is already transmitting at the best power output for the system configuration, YES branch is taken to decision block 486, where it is determined whether or not this condition has occurred M or more times, where M is a parameter greater than one. If so, YES branch is taken to block 488 where a handoff request is sent via control terminal 140 in FIG. 1 to other adjacent base site controllers. As explained hereinabove, the other adjacent base site controllers scan the handoff station to determine if one of them will accept the handoff station. Program control proceeds from NO branch of decision block 486 and from block 488 to block 494 where the selected station timer is reset.

If the selected station is not already transmitting at maximum or optimum power output. NO branch is taken from decision block 478 in FIG. 3F to decision block 490, where it is determined whether or not this condition has occurred K or more times, where K is a parameter greater than one. If so, YES branch is taken to block 492 where microprocessor 358 in FIG. 2 sends a control signal to the selected station commanding it to increase its power output. The power output can be increased in one or more steps until the optimum power output is reached. Program control proceeds from NO branch of decision block 490 and from 492 to block 494 where the selected station timer is reset. Thereafter, program control returns to scanning the signalling channel.

A particular problem, addressed by the present invention, is that of the potential lack of a received signal from a portable remote station which utilizes voice operated transmitter (VOX) circuitry to minimize the power drain from a necessarily small portable battery. VOX circuitry operates in a well known fashion, turning the portable transmitter off when no voice signals are to be transmitted and activating the transmitter when a voice signal to be transmitted is detected. Since the appearance of a signal from the portable is related to the presence of voice at the portable and unrelated to the scanning process at the base site, the likelihood that a signal would not be present at the base site during a scanning period is high. Referring again to FIG. 3C, a determination of wrong SAT or no received SAT at block 457 causes a SAT miss counter to be incremented by one, at 432. A determination is then made (at 433) whether the number of times the SAT has been missed equals a predetermined number, L. In the preferred embodiment L has been selected as four. If the number of missed SATs does not exceed L, a determination is made, at 434, whether the number of missed SATs equals a predetermined number, I, which is greater than L. In the preferred embodiment, I equals seven. If I is equaled, the call is terminated in conventional fashion at 435. If I misses have not been measured, the station timer is reset at 436, and the process continues in its normal activities.

Returning to the determination of whether the number of SATs equals L (at 433), if L is equalled, a determination is made (at 437) whether the remote unit has the capability of VOX operation. If the remote unit does not have this capability, the process moves to decision block 434 of FIG. 3D. If the remote has VOX capability, an audit signal is generated and transmitted to the remote unit and the fixed equipment is set to make a delayed emergency scan (at 438). The delay in the preferred embodiment is set at one second. The remote unit receives the audit signal, in the preferred embodiment, on the voice channel via a high speed data transmission transmitted during a brief period of blanked-out voice signal from the fixed equipment. In response to the audit signal, the remote unit turns on (keys) its transmitter for a period of time which is calculated to allow one or more measurement of signal quality. It can be appreciated that the number of times a high speed transmission and blanked-out audio should be transmitted should be kept to a minimum to avoid undue interruption of the user's conversation. After the setting of the delayed emergency scan, the station timers are reset (at 436) and the process returns to normal function.

Once the emergency scan request timer times out, the program detects the need for an immediate scan as previously described for blocks 415 and 419 in FIG. 3A. Upon detection, the program goes to the signal measurement process previously discussed for blocks 454, 456, and 458. Assuming that the portable has keyed its transmitter in response to the audit signal, the proper SAT will be detected at the decision block 457 in FIG. 3C. The YES branch will be taken from decision 457 and a test of the emergency scan request (at 459 of FIG. 3) is made. If the emergency scan request has not been made, the signal strength indicator (SSI) samples and the corresponding antennas are stored in memory (at 439). The process then progresses to the determination of appropriate action to be taken in the configuration of the system transmitting and receiving characteristics as shown in FIG. 3E. This process has been described previously.

If the emergency scan request has been made the decision block 459 of FIG. 3D yields a YES decision and a determination is made of the VOX capability of the remote unit (at 440). If the remote unit is a normal, non-VOX unit, the SSI samples and antennas are stored (at 441). The power change request and antenna change request incremental thresholds, M, N, and J are set to one less than the change thresholds (at 442) and the process progresses to the system configuration decision process of FIG. 3E.

If decision block 440 indicates a VOX capable remote unit, the SSI samples and antennas are stored (at 443). The handoff request, power change request, and antenna change request incremental thresholds are each set to one less than the thresholds required for change (at 444), the station timer is set to cause a re-scan of this particular remote unit in one second (at 445), the emergency scan request is reset (at 446), and the process returns to its normal processing Thus, the scanning receiver is required to make two measurements of the signal strength of a portable remote unit after the portable remote unit has been commanded to transmit via an audit message. The fixed station equipment is assured that it is making an accurate measurement of signal quality even though the remote unit has a VOX transmitter.

Figure 5:
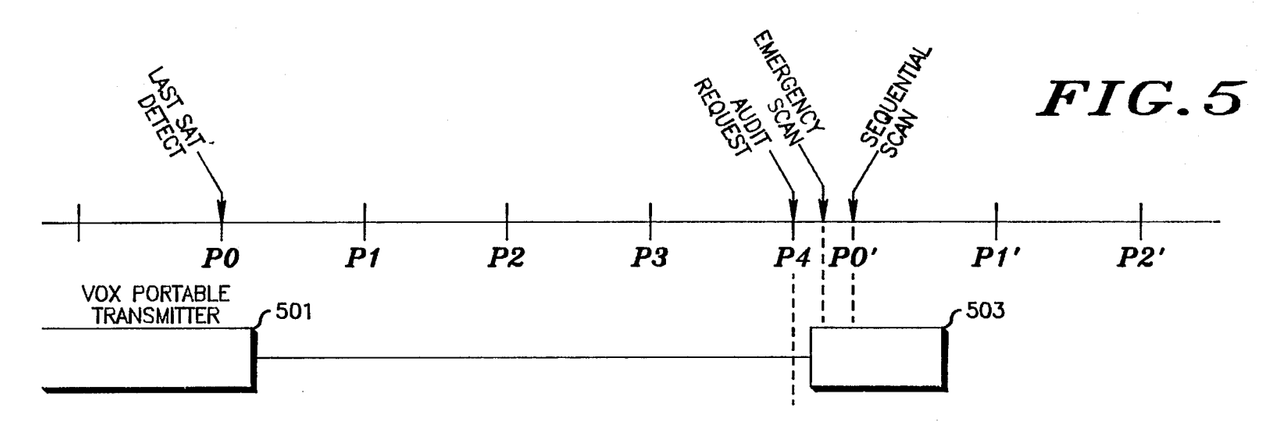
FIG. 5 is a timing diagram illustrating the system response to the process of the present invention.

It is an important feature of the present invention that the portable not be keyed unnecessarily often but when it is keyed, the base site should attempt to accurately measure the portable signal strength during the six second period that the portable is keyed. The system operation can best be apprehended by referring to FIG. 5. The signal strength received at the base site receiver is diagrammed in the lower trace and the seven second scan periods are diagrammed in the upper trace as period P0, P1, etc. The VOX portable remote unit transmitter turns off at 501, some time after the last SAT detect was made at P0. When the station timer times out, a scan of the voice channel occupied by the portable is scanned at P1 as previously described. Since the SAT is not present, a count of missed SAT events is kept. No decisions are made to improve the signal of a VOX portable (i.e. handoff, power change, or antenna change) at this time when SAT is not detected. After a predetermined number (i.e., four) of missed periods of SAT, P4, an audit request is made of the portable unit if it is classified as a station capable of VOX. This audit request is transmitted on the forward voice channel to the portable and, upon reception, causes the portable to key its transmitter for six seconds as shown starting at 503. In the meantime, the scanning receiver 240 will move on to the next measurement of another remote unit. After a delay to enable the instruction to be received by the portable and cause the keying of the transmitter (one second in the preferred embodiment), the scanning receiver 204 is commanded to make an emergency scan measurement of the VOX portable. Since this scan is a special request, the scanning receiver knows that the measurement is accurate because the portable should have its transmitter keyed. The signal strength and presence of SAT are stored, as described previously, and one additional measurement is required to be assured that a temporary signal fade is not adversely affecting the signal strength measurement. Since the type of signal fades which would most affect the short term measurement performed are Rayleigh distributed, the additional signal strength measurement should be performed slightly later in time. To accomplish this, the station timer in the preferred embodiment of the fixed equipment is reset to perform a sequential scan measurement one second after the emergency scan. The scanning receiver does not view this measurement as a special request, but as a normal scan event that is required to have SAT present before making a conclusion about whether to handoff, power change, or adjust the receive antenna matrix. The scan period timing for the portable is reestablished at P0' and a scan measurement is made at subsequent seven second increments (at P1', P2', etc.). If two consecutive readings agree, an accurate decision can be made for the VOX portable.

Figure 6:
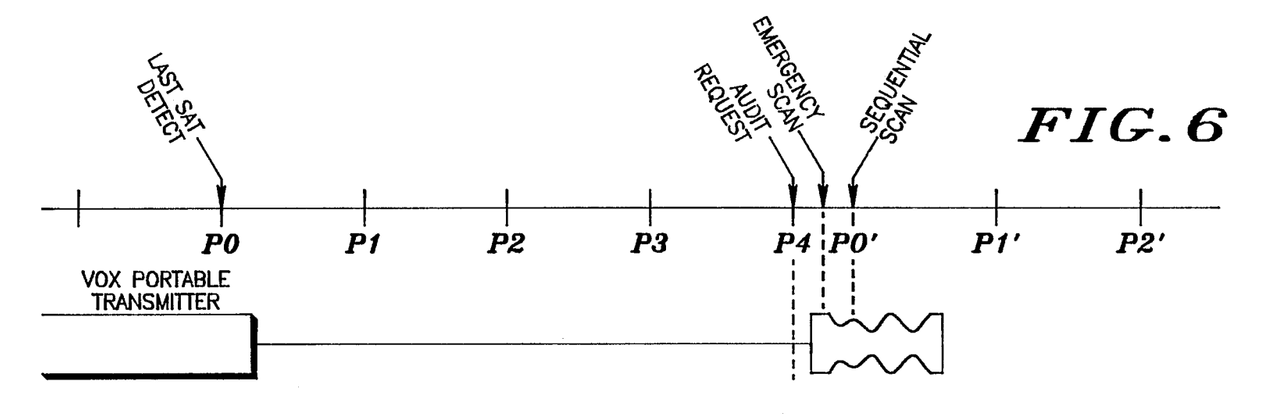
FIG. 6 is a timing diagram illustrating the system response to the process of the present invention when the received signal strength from the remote unit varies.

If the two consecutive readings do not agree, as is illustrated in FIG. 6, it is assumed that a signal fade caused a temporary low reading. No action is taken when the two adjacent scan signal strength readings do not agree within a predetermined tolerance. Action will only be taken when the next two consecutive readings are in agreement and it is known that the VOX portable is keyed.

Figure 7:
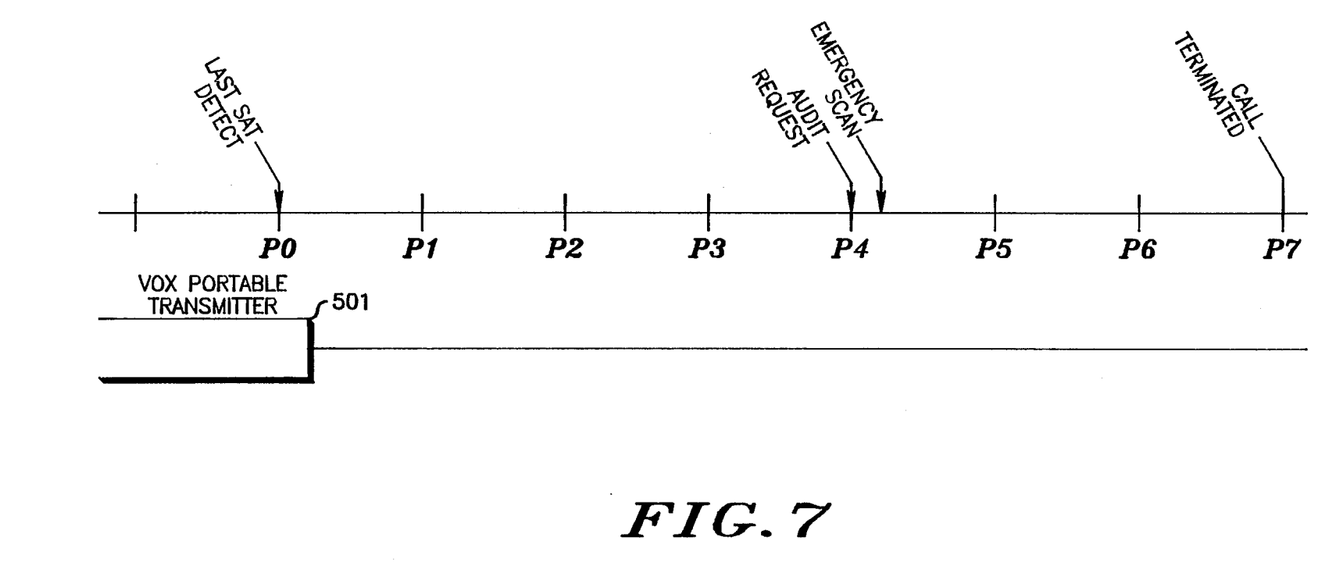
FIG. 7 is a timing diagram illustrating the system response to the process of the present invention when no signal is received from the remote unit.

If SAT is not detected after an audit request, as shown in FIG. 7, no further action is performed except that is the absence of SAT persists for three more scan periods (until P7), the VOX portable is assumed lost and the call is terminated.

Two positive results come from the above sequence of operations. First, the number of audits of a portable remote unit is limited to one every 28 seconds thereby reducing the number of breaks in audio when the digital audit message is sent to the cellular subscriber and reducing battery drain for battery operated VOX remote units. Second, we can be assured that the remote unit measured is the one assigned to this frequency in this cell, and not one which is a co-channel co-SAT user in another cell.

Asynchronous to all this hardware integration of SAT presence is being made and reported to a higher level controllers such as a control terminal 140 previously described. When the higher level controller determines that SAT has been absent for greater than 32 seconds, it requests an audit much the same as the scan receiver, delays for the VOX remote unit to key, then makes the emergency request of the scan receiver to measure the remote unit before it de-keys. This places a check and balance on the scan receiver and voice transceiver in case the SAT detector on one or the other is faulty.

When consecutive accurate measurements with SAT indicate that the remote unit requires a handoff to another sector or cell, the VOXed remote unit will again be asked to key up (with the use of a audit) after a short delay from when a handoff request is made to the control terminal. This will allow the surrounding cell sites to make a measurement to determine if they can accept the remote unit adequately.

In summary, then, a cellular system uniquely tailored to provide radiotelephone service to portable remote units having a voice operated transmitter (VOX) to reduce current drain from the portable unit's battery has been shown and described. Because the cellular system fixed site equipment periodically measures the signal quality (via a plurality of closely spaced measurements of signal strength) of each remote unit having service, there is a good likelihood that the VOX portable transmitter will not be transmitting at the time the periodic signal quality measurement is made. To resolve this problem in a cellular system serving a large number of remote units and therefore requiring a large number of signal quality measurements, the fixed site equipment detects a number of missed supervisory audio tone (SAT) transponder detects from the periodic signal quality measurements. Missed SAT detects indicate the lack of a received signal from the remote unit. If the number of missed SATs occurs, the fixed site equipment transmits an audit request to the remote unit, sets an emergency scan timer in the operating program, and proceeds in its regularly scheduled measurements of other remote units. When the remote unit receives the audit request, the transmitter is automatically keyed and transmits for a given period of time. Upon the time-out of the emergency scan timer in the fixed site equipment (which is planned to occur after any naturally occurring delays in causing the remote unit to key its transmitter have expired), an emergency scan of remote unit signal quality is performed by the fixed site equipment at a time when the VOX remote unit is known to be transmitting and with a minimum time interruption in the fixed site equipment schedule of events. However, since a one period measurement of signal quality may be erroneous because of a signal path fade, a second signal quality measurement is scheduled into the fixed site equipment process with a predetermined delay from the emergency scan measurement. The two signal quality measurements made during the time when the VOX remote unit is known to be transmitting are then compared. If the measurements are sufficiently alike, the fixed site equipment and cellular system may proceed, as needed, with conventional system reconfiguration such as remote unit handoff, cell site antenna change, or remote unit power change. If the two measurements are unlike, system reconfiguration is inhibited and the signal quality measurement process returns to its normal periodic measurements. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A radio communications system providing service to a remote unit having a voice operated transmitter (VOX) and able to determine a need for changing the system configuration of receiving and transmitting between the remote unit and at least one fixed station, comprising:
   means for measuring, at predetermined intervals of time, the signal quality received from the remote unit at a fixed station;
   means for transmitting an audit request to the remote unit from said fixed station after a predetermined number of said measurements indicate that a signal is not being received from the remote unit at said fixed station;
   means, at the remote unit, for transmitting for a predetermined period of time in response to said audit request;
   means for making a first measurement of signal quality from said remote unit transmission after said audit request transmission and a first predetermined time delay, and means for storing said first measurement of signal quality;
   means for making a second measurement of signal quality from said remote unit transmission a second predetermined time delay after said first measurement;
   means for comparing said second measurement to said stored first measurement; and
   means for determining whether a need for change in system configuration is required by said first and second measurements of signal quality if said comparison indicates measurements which are similar.

2. A radio communications system in accordance with claim 1 wherein said means for inhibiting change further comprises means for commencing said measuring signal quality at predetermined intervals of time and enabling change if required thereafter.

3. A radio communications system in accordance with claim 1 wherein said means for measuring signal quality at predetermined intervals of time further comprises a scanning receiver.

4. A radio communications system in accordance with claim 1 wherein said means for measuring signal quality at predetermined intervals of time further comprises means for measuring a plurality of signal strength samples.

5. A radio communications system in accordance with claim 1 wherein said means for measuring signal quality at predetermined intervals of time further comprises means for detecting a supervisory audio tone (SAT), thereby determining if a signal is being received from the remote unit.

6. A radio communications system in accordance with claim 5 wherein said means for making a first measurement of signal quality further comprises means for detecting a SAT.

7. A radio communications system in accordance with claim 1 further comprising means for inhibiting change in system configuration if said comparison indicates measurements which are not similar.

8. A method in a radio communications system of measuring signal quality from a remote unit having a voice operated transmitter (VOX) to determine a need for changing the system configuration of receiving and transmitting between the remote unit and at least one fixed station, comprising the steps of:
   measuring, at predetermined intervals of time, the signal quality received from the remote unit at a fixed station;
   transmitting an audit request to the remote unit from said fixed station after a predetermined number of said measurements indicate that a signal is not being received from the remote unit at said fixed station;
   transmitting, at the remote unit, for a predetermined period of time in response to said audit request;
   making a first measurement of signal quality from said remote unit transmission after said audit request transmission and a first predetermined time delay, and storing said first measurement of signal quality;
   making a second measurement of signal quality from said remote unit transmission a second predetermined time delay after said first measurement;
   comparing said second measurement to said stored first measurement; and
   determining whether a need for change in system configuration is required by said first and second measurements of signal quality if said comparison indicates measurements which are similar.

9. A method in accordance with the method of claim 8 wherein said step of inhibiting change further comprises the step of commencing said measuring signal quality at predetermined intervals of time and enabling change if required thereafter.

10. A method in accordance with the method of claim 8 wherein said step of measuring signal quality at predetermined intervals of time further comprises the step of measuring a plurality of signal strength samples.

11. A method in accordance with the method of claim 8 wherein said step of measuring signal quality at predetermined intervals of time further comprises the step of detecting a supervisory audio tone (SAT), thereby determining if a signal is being received from the remote unit.

12. A method in accordance with the method of claim 11 wherein said step of making a first measurement of signal quality further comprises the step of detecting a SAT.

13. A method in accordance with the method of claim 8 further comprising the step of inhibiting change in system configuration if said comparison indicates measurements which are not similar.

14. A method in a cellular radiotelephone communications system of measuring signal strength from a portable remote unit having a voice operated transmitter (VOX) to determine a need for changing the system configuration of receiving and transmitting between the remote unit and at least one fixed station, including handoff, antenna change, and power change, comprising the steps of:

measuring, at predetermined intervals of time, the integrated signal strength received from the portable remote unit at a serving fixed station;

transmitting an audit request to the portable remote unit from said fixed station after at least one of said measurements indicate that a supervisory audio tone (SAT) is not being received from the portable remote unit at said fixed station;

transmitting, at the portable remote unit, for at least six seconds in response to said audit request;

making a first measurement of integrated signal strength from said portable remote unit transmission at said serving fixed station if a SAT is detected after a delay of at least one second from said audit request transmission, and storing said first measurement of integrated signal strength;

making a second measurement of integrated signal strength from said portable remote unit transmission at least one second after said first measurement if a SAT is detected during said first measurement;

comparing said second measurement to said stored first measurement;

determining whether a need for change in system configuration is required by said first and second measurements of integrated signal strength if said comparison indicates measurements which are similar; and inhibiting change in system configuration if said comparison indicates measurements which are not similar.

* * * * *